(12) United States Patent
Muto

(10) Patent No.: US 8,064,500 B2
(45) Date of Patent: Nov. 22, 2011

(54) CORRELATION CALCULATION CONTROL CIRCUIT AND CORRELATION CALCULATION CONTROL METHOD

(75) Inventor: Nobuo Muto, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 803 days.

(21) Appl. No.: 11/961,430

(22) Filed: Dec. 20, 2007

(65) Prior Publication Data

US 2009/0121924 A1      May 14, 2009

(30) Foreign Application Priority Data

Dec. 26, 2006   (JP) ................................. 2006-349194

(51) Int. Cl.
*H04B 1/00*       (2006.01)

(52) U.S. Cl. ................ 375/150; 324/76.33; 340/426.19; 340/539.13; 342/108; 342/378; 359/306; 367/40; 701/213; 701/215

(58) Field of Classification Search ........................ None
See application file for complete search history.

(56) References Cited

U.S. PATENT DOCUMENTS

| | | | | |
|---|---|---|---|---|
| 5,576,715 A | * | 11/1996 | Litton et al. | 342/357.72 |
| 6,157,341 A | * | 12/2000 | Silvestrin et al. | 342/357.68 |
| 7,180,446 B2 | * | 2/2007 | Wang et al. | 342/357.69 |
| 2003/0081661 A1 | * | 5/2003 | Stein et al. | 375/150 |

FOREIGN PATENT DOCUMENTS

JP     H11-242075 A     9/1999

* cited by examiner

*Primary Examiner* — David C. Payne
*Assistant Examiner* — Adolf DSouza
(74) *Attorney, Agent, or Firm* — Global IP Counselors, LLP

(57) ABSTRACT

A coherent integration section synthesizes an IF signal stored in a memory and a C/A code replica generated by a code generation section using a mixer to calculate a correlation value, and integrates the correlation value using an integration section. An integration count monitoring section counts the integration count of the integration section. When a saturation control section has detected saturation of integration of the correlation values, the integration count monitoring section causes the integration section to suspend integration when the integration count is equal to or less than a reference count, and allows the integration section to continue integration when the integration count has exceeded the reference count.

12 Claims, 4 Drawing Sheets

STRONG SIGNAL

CROSS-CORRELATION

CORRELATION CALCULATION CONTROL CIRCUIT AND CORRELATION CALCULATION CONTROL METHOD

Japanese Patent Application No. 2006-349194 filed on Dec. 26, 2006, is hereby incorporated by reference in its entirety.

BACKGROUND OF THE INVENTION

The present invention relates to a correlation calculation control circuit and a correlation calculation control method.

In the global positioning system (GPS) which is one type of satellite positioning system, GPS satellite signals are respectively transmitted from GPS satellites which orbit the earth, and a GPS receiver calculates the present position based on the received GPS satellite signals.

The GPS satellite transmits a radio wave in the L1 band (1575.42 MHz) and a radio wave in the L2 band (1227.6 MHz). Commercial GPS receivers are permitted to use only the GPS satellite signal in the L1 band. The GPS satellite signal in the L1 band is a spread spectrum signal which is modulated by a coarse/acquisition (C/A) code (pseudo random noise (PRN) signal which differs depending on the satellite) and a navigation message. The navigation message includes an almanac (approximate orbit information of all the GPS satellites), an ephemeris (precise orbit information of the GPS satellite), time information, and the like.

The GPS receiver acquires/tracks the received GPS satellite signal, and decodes the navigation message included in the GPS satellite signal. The GPS receiver then calculates the present position based on the orbit information of the GPS satellite and the time information included in the decoded navigation message. Specifically, the GPS receiver calculates the position of each GPS satellite when the GPS satellite has transmitted the GPS satellite signal and the pseudo-range from the GPS receiver to each GPS satellite from the difference between the time at which each GPS satellite has transmitted the GPS satellite signal and the time at which the GPS receiver has received the GPS satellite signal. The GPS receiver calculates the present position by solving simultaneous equations in which the three-dimensional position of the GPS receiver and the clock error between the GPS satellite and the GPS receiver are unknown quantities. The GPS receiver can calculate its three-dimensional position by receiving the GPS satellite signals from at least four GPS satellites. This is because each coordinate value of the three-dimensional position and the clock error between the GPS satellite and the GPS receiver are used as unknown quantities.

The GPS receiver acquires the GPS satellite signal by performing correlation calculations on the received signal and a C/A code replica. The C/A code replica is a signal which simulates the C/A code included in the acquisition target GPS satellite signal and is pseudo-generated by the GPS receiver. Specifically, the GPS receiver performs a coherent process which calculates the correlation between the C/A code included in the received signal and the C/A code replica (code replica) using FFT calculations, and an incoherent process which integrates the correlation values (results of the coherent process) to calculate the integrated correlation value. As a result, the phases of the C/A code and a carrier frequency contained in the GPS satellite signal are obtained (see JP-A-11-242075, for example).

In the coherent integration process, a phenomenon may occur in which the integrated correlation value is saturated (i.e., a memory which stores the integrated value overflows). When saturation of the integrated values has been detected, a related-art GPS receiver temporarily suspends coherent integration (i.e., suspends integration of the correlation values) until the present integration time expires. However, it may be desirable that integration of the correlation values not be suspended depending on the cause of saturation.

For example, the integrated values may be saturated when the strength of the received signal is high (strong signal) or when cross-correlation has occurred. When the integrated values are saturated due to a strong received signal, no problem occurs even if integration of the correlation values is suspended, since the peak value of the integrated value has reached a value sufficient for determination of the phase of the C/A code and the like.

The term "cross-correlation" refers to a phenomenon in which not only the correlation between the C/A code of the acquisition target GPS satellite signal included in the received signal and the C/A code replica, but also the correlation between a signal component other than the C/A code and the C/A code replica is detected. When saturation has occurred due to cross-correlation, the integrated value includes a plurality of peak values. In this case, whether the detected saturation is saturation due to the peak value of the C/A code or saturation due to the peak value of the signal component other than the C/A code cannot be determined at this point. Specifically, the peak value of the C/A code of the acquisition target GPS satellite signal may be insufficient when saturation has been detected. In this case, the GPS satellite signal is not accurately acquired if integration of the correlation values is suspended. This increases the period of time required for positioning calculations (particularly initial position calculations). Therefore, it is desirable that integration of the correlation values not be suspended when saturation due to cross-correlation has occurred.

SUMMARY

According to one aspect of the invention, there is provided a correlation calculation control circuit comprising:

a correlation calculation integration section that performs correlation calculations and integrates correlation values, the correlation calculation integration section performing the correlation calculations on an identification code that is included in a received signal and identifies a transmission source of the received signal and a code replica that simulates an identification code of a given transmission source among a plurality of transmission sources;

a comparison section that compares an integration count of the integration with a given reference count;

an integration saturation detection section that detects whether or not the integration of the correlation values performed by the correlation calculation integration section has been saturated; and an integration saturation control section that controls whether or not to cause the correlation calculation integration section to suspend the integration of the correlation values based on a comparison result of the comparison section when the integration saturation detection section has detected that the integration of the correlation values has been saturated.

DETAILED DESCRIPTION OF THE EMBODIMENT

Figure 1:
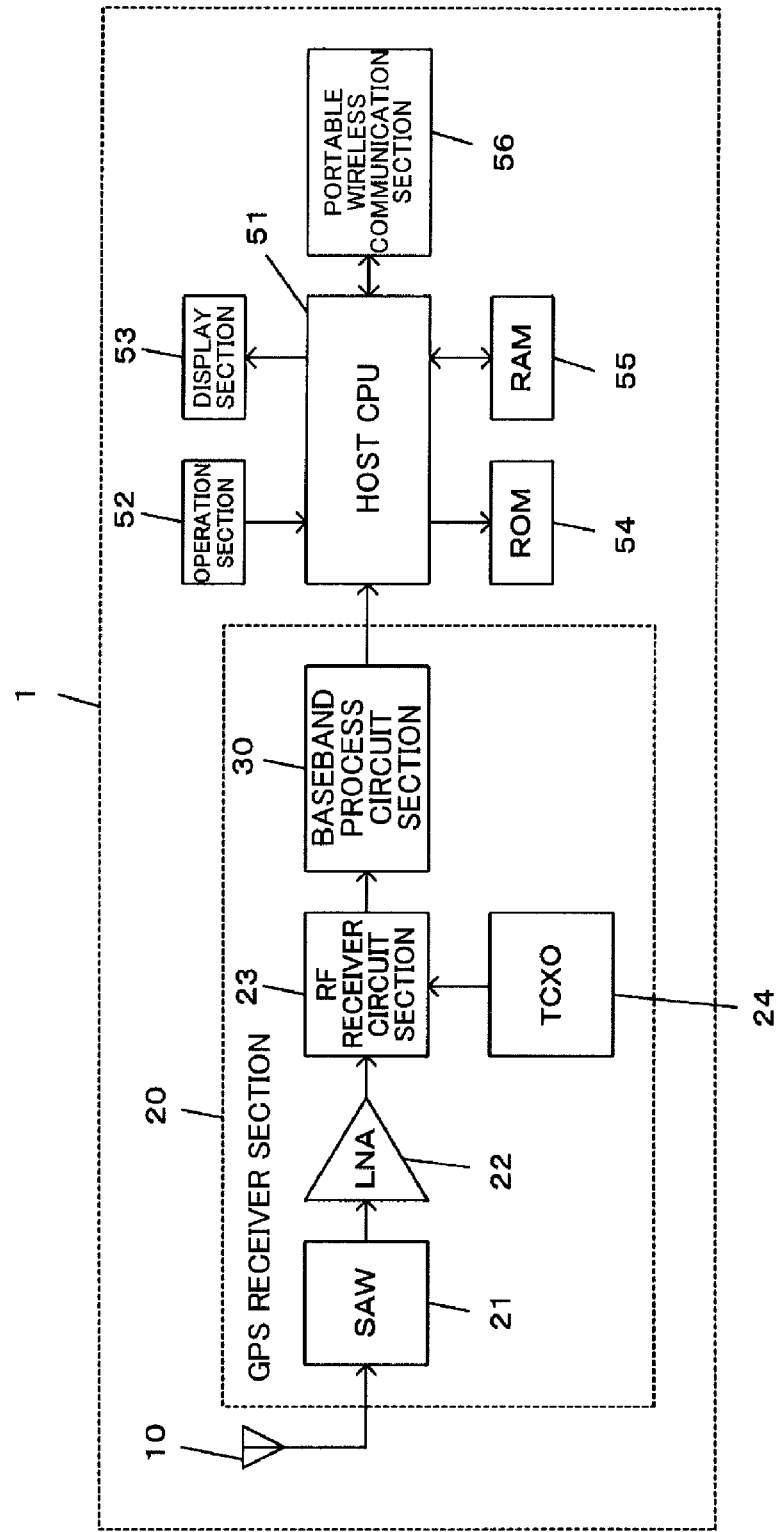
FIG. 1 is a view showing the internal configuration of a portable telephone according to one embodiment of the invention.

The invention may enable whether or not to suspend integration to be appropriately determined depending on the cause of saturation when saturation of integration of correlation values has been detected during a correlation process which calculates a correlation value between a received signal and a code replica.

According to one embodiment of the invention, there is provided a correlation calculation control circuit comprising:

a correlation calculation integration section that performs correlation calculations and integrates correlation values, the correlation calculation integration section performing the correlation calculations on an identification code that is included in a received signal and identifies a transmission source of the received signal and a code replica that simulates an identification code of a given transmission source among a plurality of transmission sources;

a comparison section that compares an integration count of the integration with a given reference count;

an integration saturation detection section that detects whether or not the integration of the correlation values performed by the correlation calculation integration section has been saturated; and an integration saturation control section that controls whether or not to cause the correlation calculation integration section to suspend the integration of the correlation values based on a comparison result of the comparison section when the integration saturation detection section has detected that the integration of the correlation values has been saturated.

According to another embodiment of the invention, there is provided a correlation calculation control method comprising:

performing correlation calculations and integrating correlation values, the correlation calculations being performed on an identification code that is included in a received signal and identifies a transmission source of the received signal and a code replica that simulates an identification code of a given transmission source among a plurality of transmission sources;

comparing an integration count of the integration with a given reference count;

detecting whether or not the integration of the correlation values has been saturated when integrating the correlation values; and controlling whether or not to suspend the integration of the correlation values based on the comparison result when it has been detected that the integration of the correlation values has been saturated.

According to the above configuration, correlation calculations are performed on the identification code included in the received signal and the code replica, and the correlation values are integrated. Whether or not to suspend integration of the correlation values is determined based on the comparison result between the integration count and the given reference count when saturation of integration of the correlation values has been detected.

In the correlation calculation control circuit, the integration saturation control section may allow the correlation calculation integration section to continue the integration of the correlation values when the comparison section has determined that the integration count has reached the reference count, and may cause the correlation calculation integration section to suspend the integration of the correlation values when the comparison section has determined that the integration count has not reached the reference count.

In the correlation calculation control method, the controlling whether or not to suspend the integration of the correlation values may include: allowing the integration of the correlation values to continue when it has been determined that the integration count has reached the reference count as a result of the comparison; and suspending the integration of the correlation values when it has been determined that the integration count has not reached the reference count as a result of the comparison.

According to the above configuration, integration of the correlation values is not suspended when it has been determined that the integration count has reached the reference count, and is suspended when it has been determined that the integration count has not reached the reference count. This enables whether or not to suspend integration of the correlation values to be appropriately determined depending on the cause of saturation of the correlation values.

Specifically, saturation of the correlation values may occur when the strength of the received signal is high (strong signal) or when cross-correlation has occurred. When the received signal is a strong signal, since the peak value of the correlation value increases as the strength of the received signal becomes higher, the correlation values are saturated when the integration count is relatively small. In this case, it is desirable that integration of the correlation values be suspended when the correlation values have been saturated. On the other hand, when cross-correlation has occurred, a plurality of peaks of the correlation values occur including the peak of the identification code of the transmission source of the received signal. However, it is difficult to determine whether or not the peak which has caused saturation of the correlation values is the peak of the identification code of the transmission source of the received signal. In this case, it is desirable to allow integration of the correlation values to continue even if the correlation values have been saturated. As described above, the cause of saturation can be determined from the comparison between the integration count and the reference count, and whether or not to suspend integration of the correlation values can be appropriately determined depending on the cause of saturation.

In the correlation calculation control circuit, the correlation calculation integration section may perform a coherent integration calculation a specific number of times or during a specific period of time.

In the correlation calculation control method, the integrating of the correlation values may include a coherent integration calculation performed a specific number of times or during a specific period of time.

According to the above configuration, the coherent integration calculation is performed a specific number of times or during a specific period of time as the correlation calculations on the identification code included in the received signal and the code replica and integration of the correlation values.

In the correlation calculation control circuit, the identification code may be a coarse/acquisition (C/A) code of a GPS satellite signal.

In the correlation calculation control method, the identification code may be a coarse/acquisition (C/A) code of a GPS satellite signal.

According to the above configuration, the identification code is the C/A code of the GPS satellite signal. Specifically, the correlation calculation control circuit can be applied to a GPS receiver which receives a GPS satellite signal.

According to a further embodiment of the invention, there is provided a positioning circuit including one of the above correlation calculation control circuits.

According to still another embodiment of the invention, there is provided an electronic instrument including one of the above correlation calculation control circuits.

Embodiments of the invention are described below with reference to the drawings. Note that the embodiments described below do not in any way limit the scope of the invention laid out in the claims. Note that all elements of the embodiments described below should not necessarily be taken as essential requirements for the invention.

A portable telephone which is an electronic instrument including a positioning circuit is described below with reference to the drawings as one of preferred embodiments of the invention.

A portable telephone 1 according to this embodiment has a telephone call function and a navigation function utilizing a built-in positioning circuit, such as plotting the present position of the portable telephone 1 located by the positioning circuit on a map and displaying the plotted position on a display. The positioning circuit calculates the present position by performing calculations based on GPS satellite signals received from a plurality of (e.g., four or more) GPS satellites.

Configuration

FIG. 1 is a block diagram showing the internal configuration of the portable telephone 1 according to this embodiment. As shown in FIG. 1, the portable telephone 1 includes a GPS antenna 10, a GPS receiver section 20, a host central processing unit (CPU) 51, an operation section 52, a display section 53, a read only memory (ROM) 54, and a random access memory (RAM) 55.

The GPS antenna 10 is an antenna which receives an RF signal including a GPS satellite signal transmitted from a GPS satellite, and outputs the received RF signal.

The GPS receiver section 20 acquires/extracts the GPS satellite signal from the RF signal received by the GPS antenna 10, and calculates the present position by performing positioning calculations based on a navigation message and the like extracted from the GPS satellite signal. The GPS receiver section 20 includes a surface acoustic wave (SAW) filter 21, a low-noise amplifier (LNA) 22, a radio frequency (RF) receiver circuit section 23, a temperature-controlled crystal oscillator (TCXO) 24, and a baseband process circuit section 30. The RF receiver circuit section 23 and the baseband process circuit section 30 of the GPS receiver section 20 may be produced as different large scale integrated (LSI) circuits, or may be produced in one chip. The entire GPS receiver section 20 including the SAW filter 21, the LNA 22, and the TCXO 24 may be produced in one chip.

The SAW filter 21 is a bandpass filter. The SAW filter 21 allows a specific band component (signal) of the RF signal input from the GPS antenna 10 to pass through while blocking a frequency component outside the specific band, and outputs the resulting signal. The LNA 22 is a low-noise amplifier. The LNA 22 amplifies the signal input from the SAW filter 21, and outputs the amplified signal. The TCXO 24 is a temperature-controlled crystal oscillator. The TCXO 24 generates an oscillation signal having a specific oscillation frequency, and outputs the generated oscillation signal. The RF receiver circuit section 23 multiplies the signal input from the LNA 22 by a signal obtained by dividing or multiplying the frequency of the oscillation signal input from the TCXO 24 to convert (down-convert) the signal input from the LNA 22 into an intermediate-frequency signal (IF signal). The RF receiver circuit section 23 then amplifies the IF signal, converts the amplified signal into a digital signal by A/D conversion, and outputs the resulting digital signal.

The baseband process circuit section 30 acquires/tracks the GPS satellite signal from the IF signal input from the RF receiver circuit section 23, and performs pseudo-range calculations, positioning calculations, and the like based on a navigation message, time information, and the like extracted by decoding the data contained in the GPS satellite signal.

Specifically, the baseband process circuit section 30 acquires the GPS satellite signal based on the IF signal input from the RF receiver circuit section 23. The baseband process circuit section 30 acquires the GPS satellite signal by extracting the GPS satellite signal from the IF signal by performing a correlation process on the IF signal. Specifically, the baseband process circuit section 30 performs a coherent process of calculating the correlation between the IF signal and a pseudo-generated C/A code replica (code replica) using FFT calculations, and an incoherent process of integrating the correlation values (results of the coherent process) to calculate the integrated correlation value. As a result, the phases of the C/A code and a carrier frequency contained in the GPS satellite signal are obtained.

After acquiring the GPS satellite signal, the baseband process circuit section 30 tracks the acquired GPS satellite signal. The baseband process circuit section 30 tracks the GPS satellite signals by synchronously holding the acquired GPS satellite signals in parallel. For example, the baseband process circuit section 30 performs a code loop which is implemented by a delay locked loop (DLL) and tracks the phase of the C/A code, and a carrier loop which is implemented by a phase locked loop (PLL) and tracks the phase of the carrier frequency. The baseband process circuit section 30 extracts the navigation message by decoding the data contained in each tracked GPS satellite signal, and performs pseudo-range calculations, positioning calculations, and the like to locate the present position.

Figure 2:
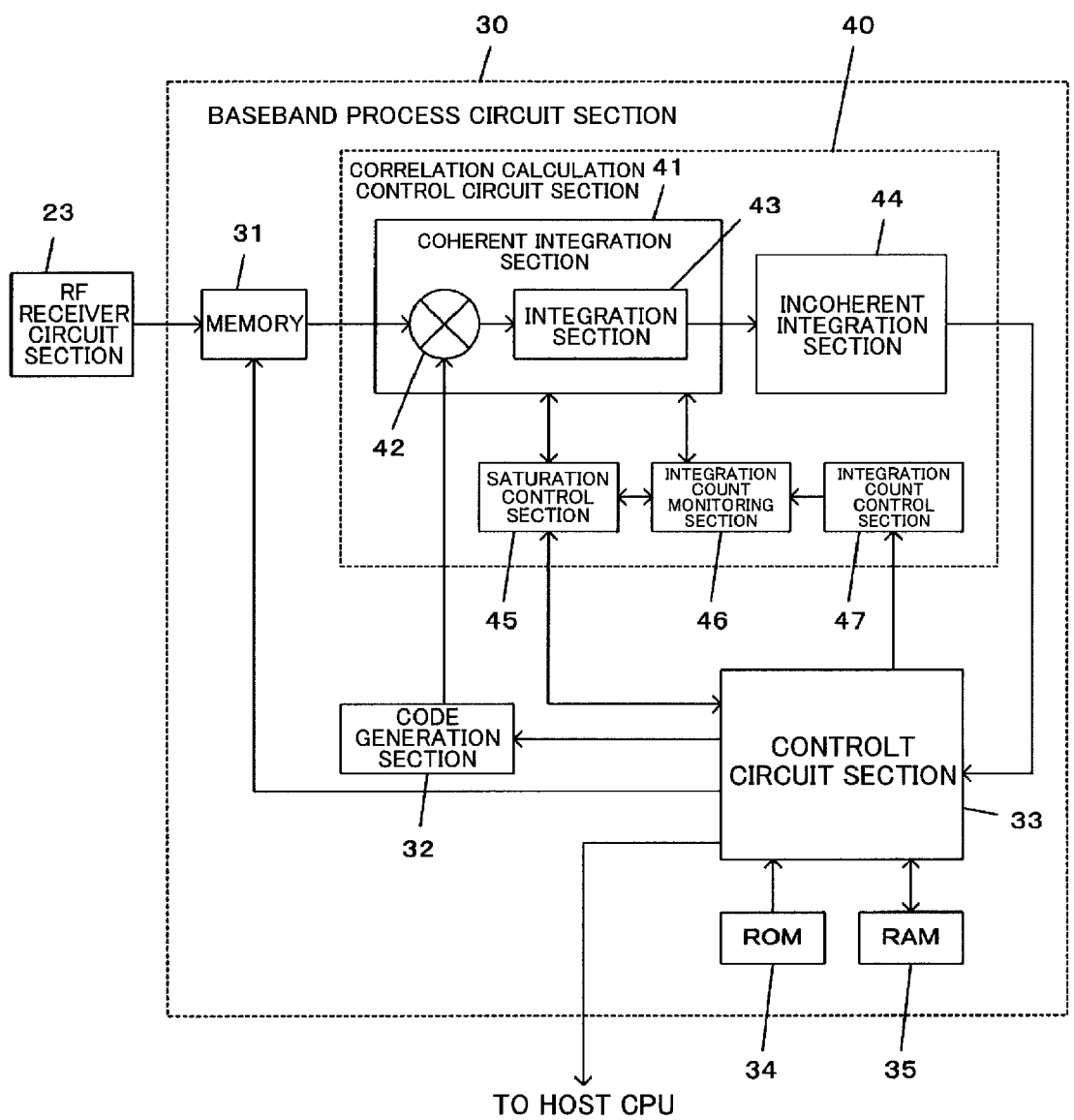
FIG. 2 is a view showing the internal configuration of a baseband process circuit section.

FIG. 2 shows the detailed circuit configuration of the baseband process circuit section 30. As shown in FIG. 2, the baseband process circuit section 30 includes a memory 31, a code generation section 32, a correlation calculation control circuit section 40, a control circuit section 33, a ROM 34, and a RAM 35.

The memory 31 samples and stores the IF signal input from the RF receiver circuit section 23 at specific time intervals based on a control signal from the control circuit section 33. The memory 31 samples the IF signal at a rate which is a multiple of the chip rate of the C/A code replica generated by the code generation section 32. The memory 31 has a storage capacity for storing at least data for the integration time of the coherent integration process performed by a coherent integration section 41.

The code generation section 32 generates the C/A code replica of the acquisition target GPS satellite based on the control signal from the control circuit section 33.

The correlation calculation control circuit section 40 performs a correlation process on the sampling data of the IF signal stored in the memory 31 and the C/A code replica generated by the code generation section 32. The correlation calculation control circuit section 40 includes the coherent integration section 41, an incoherent integration section 44, a saturation control section 45, an integration count monitoring section 46, and an integration count control section 47.

The coherent integration section 41 performs a coherent integration process on the sampling data of the IF signal stored in the memory 31 and the C/A code replica input from the code generation section 32 over a specific integration time using FFT calculations or the like. The coherent integration over the specific integration time is hereinafter referred to as "one coherent integration". The coherent integration section 41 includes a mixer 42 and an integration section 43.

The mixer 42 integrates (synthesizes) the sampling data of the IF signal stored in the memory 31 and the C/A code replica (code replica) input from the code generation section 32 to calculate a correlation value. The integration section 43 integrates the correlation values calculated by the mixer 42. The integration section 43 outputs the integrated value to the incoherent integration section 44 each time the specific integration time has expired (i.e., each time one coherent integration has been completed), and then clears the integrated value.

The incoherent integration section 44 performs an incoherent integration process on the coherent integrated value input from the coherent integration section 41. Specifically, the incoherent integration section 44 integrates the coherent integrated value input from the integration section 43 each time the coherent integration has been completed. The incoherent integration section 44 outputs the integrated value to the control circuit section 33 at specific positioning intervals (e.g., intervals of one second).

The saturation control section 45 monitors saturation of the integrated value in the integration section 43. When the saturation control section 45 has detected saturation, the saturation control section 45 outputs a saturation detection signal to the integration count monitoring section 46. The integration count control section 47 compares the integration count calculated by the integration count monitoring section 46 with a reference count input from the control circuit section 33 at any time, and outputs the comparison result to the integration count monitoring section 46.

The integration count monitoring section 46 counts the integration count (addition count) of the correlation values in the integration section 43. The integration count is cleared each time the integration time of the coherent integration process performed by the coherent integration section 41 has expired. Specifically, the integration count refers to the present integration count during each coherent integration. When the saturation detection signal which indicates that the integrated value in the integration section 43 has been saturated has been input from the saturation control section 45, the integration count monitoring section 46 determines whether or not to cause the coherent integration section 41 to suspend the coherent integration process based on the comparison result between the integration count and the reference count input from the integration count control section 47. Specifically, the integration count monitoring section 46 causes the integration section 43 to suspend integration when the integration count is equal to or less than the reference count, and allows the integration section 43 to continue integration when the integration count is greater than the reference count. When the coherent integration process has been suspended, the coherent integration process is resumed after the integration time corresponding to the suspended coherent integration has expired.

Figure 3A:
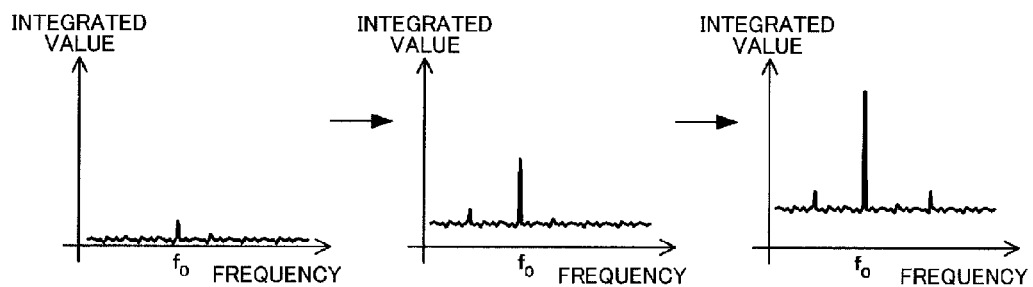
FIGS. 3A to 3C are views illustrative of the concept of an integrated correlation value.
Figure 3B:
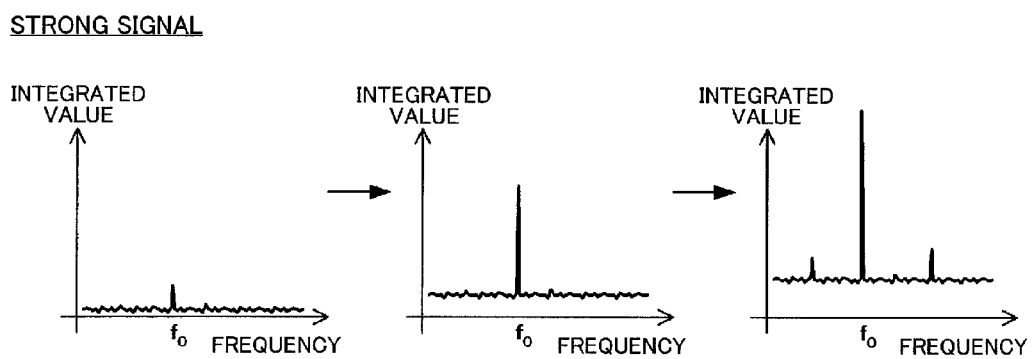
Figure 3C:
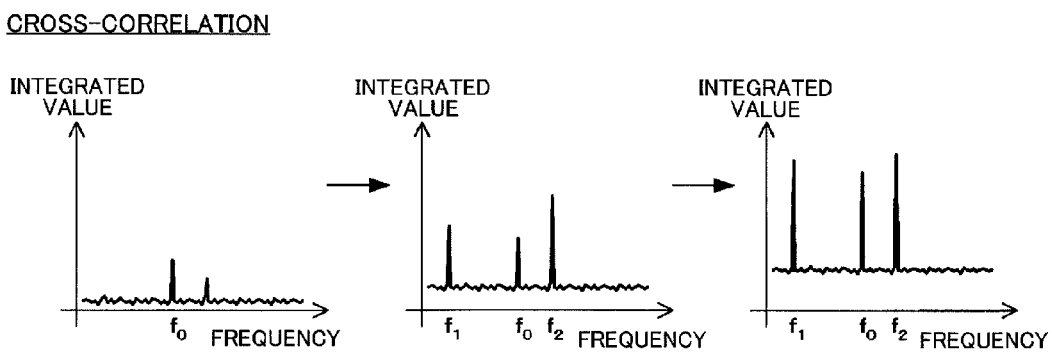

The principle of determining whether or not to suspend the coherent integration process is described below. FIGS. 3A to 3C are views illustrative of the concept of the integrated value obtained by the coherent integration process. FIGS. 3A to 3C show a change in the integrated value during one coherent integration. FIGS. 3A to 3C illustrate the integrated value immediately after starting integration, the integrated value during integration, and the integrated value at the time of completion of integration in that order from the left. As shown in FIGS. 3A to 3C, the integrated value gradually increases with the progress of integration (i.e., as the integration count increases). Ideally, a peak occurs at a carrier frequency $f_0$ of the acquisition target GPS satellite signal at the time of completion of integration, as shown in FIG. 3A.

FIG. 3B shows an example of a change in the integrated value when the strength of the received signal is high (strong signal). When the received signal is a strong signal, an increase in the peak value with respect to the integration count is larger than that of the ideal state shown in FIG. 3A. An increase in the peak value increases as the strength of the received signal becomes higher. Specifically, the integrated value is saturated (i.e., the memory which stores the integrated value overflows) before a specific number of coherent integrations are completed. Saturation occurs earlier as the strength of the received signal becomes higher, since an increase in the peak value becomes larger. Specifically, the integrated value is saturated at a smaller integration count. When the integrated value has been saturated due to a strong signal, it is desirable to cause the integration section 43 to suspend integration.

FIG. 3C shows an example of a change in the integrated value when cross-correlation has occurred. When cross-correlation has occurred, the integrated value has a plurality of peaks. In FIG. 3C, three peaks occur including a peak at the carrier frequency $f_0$ of the acquisition target GPS satellite signal and peaks at frequencies $f_1$ and $f_2$ due to cross-correlation. The control circuit section 33 in the subsequent stage determines the peak at the carrier frequency of the acquisition target GPS satellite signal from these peaks. Therefore, when saturation due to cross-correlation has occurred, it is desirable to allow the integration section 43 to continue integration. A change in the peak value due to cross-correlation is similar to that of the peak at the carrier frequency of the GPS satellite signal. Therefore, saturation due to cross-correlation occurs later than at least the saturation shown in FIG. 3B when the received signal is a strong signal.

Specifically, when the integrated value has been saturated in the integration section 43, the integration count at the time of saturation differs depending on the cause of saturation, and whether or not to cause the integration section to suspend integration is determined depending on the cause of saturation. Therefore, whether the saturation has been caused by a strong received signal or cross-correlation is determined based on the addition count when the saturation has occurred. Specifically, when the addition count at the time of saturation has not reached a specific reference count, it is determined that the integrated value has been saturated due to a strong signal so that the integration section 43 is caused to suspend integration. On the other hand, when the addition count at the time of saturation has reached the reference count, it is determined that the integrated value has been saturated due to cross-correlation so that the integration section 43 is allowed to continue integration.

Again referring to FIG. 2, the control circuit section 33 includes a processor and the like. The control circuit section 33 detects the phases of the C/A code and the carrier frequency contained in the GPS satellite signal based on the incoherent integrated value input from the incoherent integration section 44 to acquire the GPS satellite signal. The control circuit section 33 tracks the acquired GPS satellite signal, and decodes the data contained in each tracked GPS satellite signal to extract the navigation message. The control circuit section 33 performs pseudo-range calculations, positioning calculations, and the like based on the orbit information of the GPS satellite, the time information, and the like contained in the extracted navigation message to locate the present position.

The ROM 34 stores a system program which causes the control circuit section 33 to control the baseband process circuit section 30, and a program and data necessary for the control circuit section 33 to execute various processes including a baseband process. The RAM 35 is used as a work area for the control circuit section 33. The RAM 35 temporarily stores a program and data read from the ROM 34, data input from the RF receiver circuit section 23, calculation results of the control circuit section 33 based on various programs, and the like.

Again referring to FIG. 1, the host CPU 51 controls each section of the portable telephone 1 based on various programs such as the system program stored in the ROM 54. Specifically, the host CPU 51 mainly implements a telephone call function, and performs a process which implements various functions including a navigation function such as causing the display section 53 to display a navigation screen in which the present position of the portable telephone 1 input from the baseband process circuit section 30 is plotted on a map.

The operation section 52 is an input device including an operation key, a button switch, and the like. The operation section 52 outputs an operation signal corresponding to an operation of the user to the host CPU 51. The display section 53 is a display device including a liquid crystal display (LCD) or the like. The display section 53 displays a display screen based on a display signal input from the host CPU 51.

The ROM 54 stores a system program which causes the host CPU 51 to control the portable telephone 1, and an application program and data necessary for the host CPU 51 to implement various functions including the navigation function. The RAM 55 is used as a work area for the host CPU 51. The RAM 55 temporarily stores a program and data read from the ROM 54, operation data input from the operation section 52, calculation results of the host CPU 51 based on various programs, and the like.

A portable wireless communication section 56 is a known communication circuit section implemented by an antenna through which a radio signal is transmitted and received between the portable telephone 1 and a radio base station installed by a portable telephone communication service provider, an RF conversion circuit, and the like. The portable wireless communication section 56 transmits and receives a radio signal under control of the host CPU 51.

Operation

Figure 4:
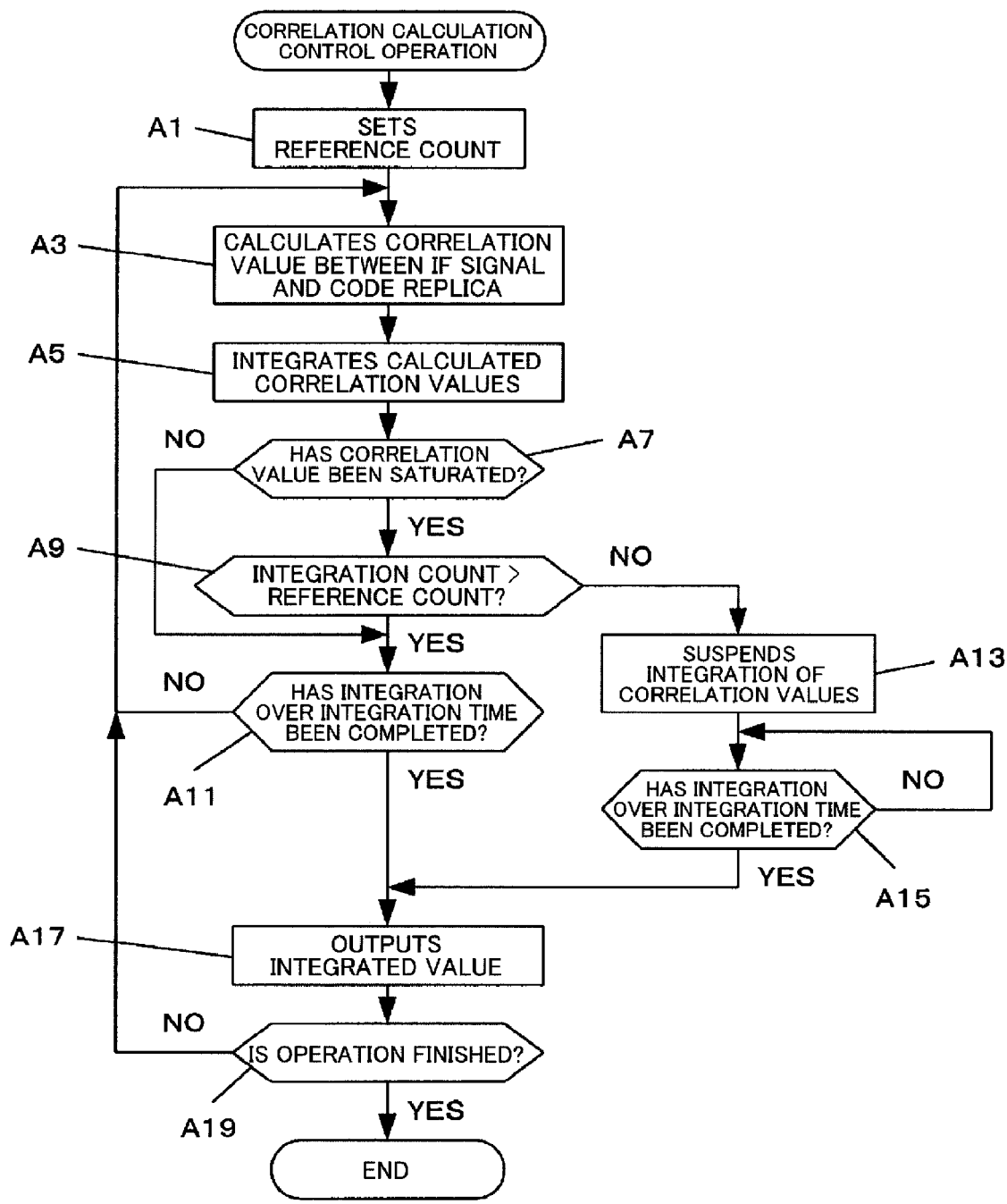
FIG. 4 is a flowchart of a correlation calculation control operation.

FIG. 4 is a view illustrative of the flow of the correlation calculation control operation of the correlation calculation control circuit section 40. As shown in FIG. 4, the control circuit section 33 determines the reference count, and outputs the determined reference count to the integration count control section 47 (step A1).

The mixer 42 synthesizes the IF signal stored in the memory 31 and the C/A code replica input from the code generation section 32 to calculate the correlation value (step A3). The integration section 43 integrates the correlation values output from the mixer 42 (step A5). The integration count monitoring section 46 then updates the integration count with a value obtained by incrementing the integration count by one. The integration count control section 47 compares the integration count calculated by the integration count monitoring section 46 with the reference count input from the control circuit section 33, and outputs the comparison result to the integration count monitoring section 46. The saturation control section 45 determines whether or not the integrated correlation value calculated by the integration section 43 has been saturated. When the saturation control section 45 has detected saturation, the saturation control section 45 outputs the saturation detection signal to the integration count monitoring section 46.

The integration count monitoring section 46 determines whether or not the saturation detection signal has been input from the saturation control section 45 (i.e., saturation of the correlation value has been detected). When saturation of the correlation value has been detected (step A7: YES), the integration count monitoring section 46 evaluates the comparison result input from the integration count control section 47. When the integration count has not exceeded the reference count (step A9: NO), the integration count monitoring section 46 causes the integration section 43 to suspend integration of the correlation values (step A13). When integration over a specific integration time has completed (step A15: YES), the integration section 43 outputs the integrated value (step A17), and clears the integrated value (step A19).

When the integration count has exceeded the reference count (step A9: YES), the integration count monitoring section 46 determines whether or not integration over a specific integration time has been completed. When integration over a specific integration time has not been completed (step A11: NO), the operation returns to the step A3. When integration over a specific integration time has been completed (step A11: YES), the integration section 43 outputs the integrated value (step A17).

When the correlation calculation control operation is not finished (step A19: NO), the operation returns to the step A3. When finishing the correlation calculation control operation (step A19: YES), the operation ends. The operation ends when a finish instruction for the correlation calculation control operation has been output from the control circuit section 33 in response to an instruction operation which turns OFF the navigation function or an instruction operation which turns OFF the power supply, for example.

Effect

According to this embodiment, when saturation of integration of the correlation values has been detected during the coherent integration process, the integration count at the time of saturation is compared with the reference count, and whether or not to suspend integration is determined depending on the comparison result. Specifically, when the integration count is equal to or less than the reference count, it is determined that the saturation has occurred due to a strong received signal so that the integration section 43 is caused to suspend integration. When the integration count has exceeded the reference count, it is determined that the saturation has occurred due to cross-correlation so that the integration section 43 is allowed to continue integration. This enables the GPS satellite signal to be promptly acquired, whereby the period of time required for positioning calculations can be reduced.

Modification

The application of the invention is not limited to the above embodiments. Various modifications and variations may be made without departing from the scope of the invention.

(A) Host CPU

For example, some or all of the processes performed by the CPU 31 of the baseband process circuit section 30 may be performed by the host CPU 51 by means of software.

(B) Electronic Instrument

The above embodiments have been described taking the case of applying the invention to a portable telephone as an electronic instrument including a positioning circuit. Note that the invention may also be applied to other electronic instruments such as a personal digital assistant (PDA), a portable navigation system, and a car navigation system.

(C) Satellite Positioning System

The above embodiments have been described taking the case of utilizing the GPS. Note that the invention may also be applied to other satellite positioning systems such as the global navigation satellite system (GLONASS).

(D) Condition Whereby Integration Section 43 is caused to Suspend Integration In the above embodiments, when the integration count has exceeded the reference count, the integration section 43 is allowed to continue integration even if saturation of the correlation values has been detected. In this case, the integration section 43 may be caused to suspend integration if the sign of the integrated value of the integration section 43 is reversed (i.e., roll-over occurs) by allowing the integration section 43 to continue integration.

(E) Reference Count

The reference count may be variable. For example, when the coherent integration time is changed depending on the signal strength of the received signal, the reference count is increased or decreased depending on the change in the integration time.

Although only some embodiments of the invention have been described above in detail, those skilled in the art would readily appreciate that many modifications are possible in the embodiments without materially departing from the novel teachings and advantages of the invention. Accordingly, such modifications are intended to be included within the scope of the invention.

What is claimed is:

1. A correlation calculation control circuit comprising:
    a correlation calculation integration section that performs correlation calculations and integrates correlation values, the correlation calculation integration section performing the correlation calculations on an identification code that is included in a received signal and identifies a transmission source of the received signal and a code replica that simulates an identification code of a given transmission source among a plurality of transmission sources;
    a comparison section that compares an integration count of the integration with a given reference count;
    an integration saturation detection section that detects whether or not the integration of the correlation values performed by the correlation calculation integration section has been saturated; and
    an integration saturation control section that determines whether the integration of the correlation values has been saturated due to cross-correlation or the received signal that is a strong signal, and controls whether or not to cause the correlation calculation integration section to continue the integration of the correlation values based on a result of the comparison performed by comparison section when the integration saturation detection section has detected that the integration of the correlation values has been saturated.

2. The correlation calculation control circuit as defined in claim 1, the integration saturation control section determining that the integration of the correlation values has been saturated due to cross-correlation, and causing the correlation calculation integration section to continue the integration of the correlation values when the integration count when the integration saturation detection section has detected that the integration of the correlation values has been saturated exceeds the reference count.

3. The correlation calculation control circuit as defined in claim 1, the correlation calculation integration section performing a coherent integration calculation a specific number of times or during a specific period of time.

4. The correlation calculation control circuit as defined in claim 1, the identification code being a coarse/acquisition (C/A) code of a GPS satellite signal.

5. A positioning circuit including the correlation calculation control circuit as defined in claim 4.

6. An electronic instrument including the correlation calculation control circuit as defined in claim 1.

7. The correlation calculation control circuit as defined in claim 1, further comprising:
    a reference count change section that changes the reference count depending on an integration time.

8. A correlation calculation control method comprising:
    performing correlation calculations and integrating correlation values, the correlation calculations being performed on an identification code that is included in a received signal and identifies a transmission source of the received signal and a code replica that simulates an identification code of a given transmission source among a plurality of transmission sources;
    comparing an integration count of the integration with a given reference count;
    detecting whether or not the integration of the correlation values has been saturated when integrating the correlation values; and
    determines whether the integration of the correlation values has been saturated due to cross-correlation or the received signal that is a strong signal, and controlling whether or not to continue the integration of the correlation values based on a result of the comparison when it has been detected that the integration of the correlation values has been saturated.

9. The correlation calculation control method as defined in claim 8, further comprising:
    determining that the integration of the correlation values has been saturated due to cross-correlation, and continuing the integration of the correlation values when the integration count when it has been detected that the integration of the correlation values has been saturated exceeds the reference count.

10. The correlation calculation control method as defined in claim 8, the integrating of the correlation values including a coherent integration calculation a specific number of times or during a specific period of time.

11. The correlation calculation control method as defined in claim 8, the identification code being a coarse/acquisition (C/A) code of a GPS satellite signal.

12. The correlation calculation control method as defined in claim 8, further comprising:
    changing the reference count depending on an integration time.

* * * * *